(No Model.)

F. JURSCHINA.
FILTERING MATERIAL AND PROCESS OF MAKING SAME.

No. 597,678. Patented Jan. 18, 1898.

Witnesses.
Victor Herzel
Josef Prohaska

Inventor.
Franz Jurschina
per Anton v. Herr
Attorney

UNITED STATES PATENT OFFICE.

FRANZ JURSCHINA, OF VIENNA, AUSTRIA-HUNGARY.

FILTERING MATERIAL AND PROCESS OF MAKING SAME.

SPECIFICATION forming part of Letters Patent No. 597,678, dated January 18, 1898.

Application filed November 30, 1896. Serial No. 614,033. (No specimens.) Patented in Hungary April 1, 1896, No. 6,109; in Austria May 2, 1896, No. 46/1,744; in France August 13, 1896, No. 258,888; in Turkey August 26, 1896, No. 540; in Belgium August 28, 1896, No. 123,245; in Italy September 30, 1896, XXXI, 42,427, and in Spain November 20, 1896, No. 19,522.

*To all whom it may concern:*

Be it known that I, FRANZ JURSCHINA, a subject of the Emperor of Austria-Hungary, residing at Vienna, in the Province of Lower Austria, in the Empire of Austria-Hungary, have invented a new and useful Filtering Material and Process of Making the Same, (for which I have received Letters Patent in Austria, No. 46/1,744, dated May 2, 1896; in Hungary, No. 6,109, dated April 1, 1896; in France, No. 258,888, dated August 13, 1896; in Belgium, No. 123,245, dated August 28, 1896; in Spain, No. 19,522, dated November 20, 1896; in Italy, No. XXXI, 42,427, dated September 30, 1896, and in Turkey, No. 540, dated August 26, 1896,) of which the following is a specification.

This invention relates to the porous materials through which liquids, more especially water, are passed in order to free them from small solid impurities suspended therein.

The invention has for its object to provide a plastic or doughy and subsequently hardening mass, from which hollow bodies for filtering purposes can easily be formed, to which any desired degree of porosity or permeability can be given and which shall stand the actions of acids, alkalies, and heat, so that it may be sterilized after use by heating it.

The annexed sheet of drawings exemplifies some forms of filters in which the filtering stratum is formed by hollow bodies made of the material referred to.

Figure 5:
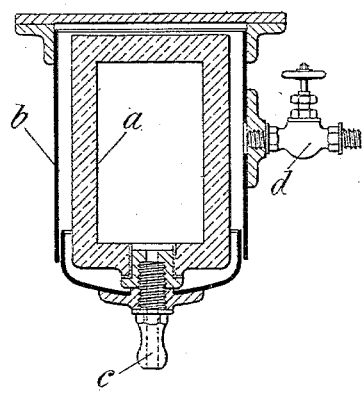
Figure 6:
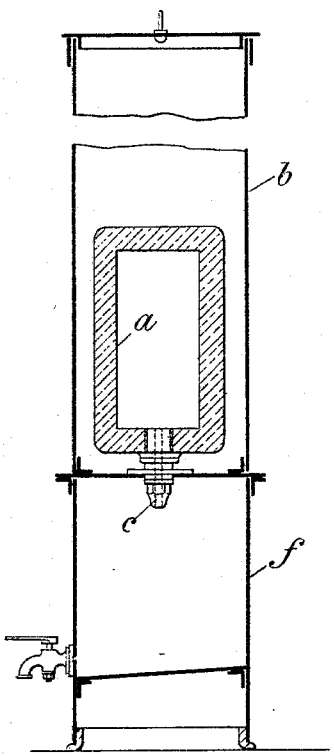
Figure 7:
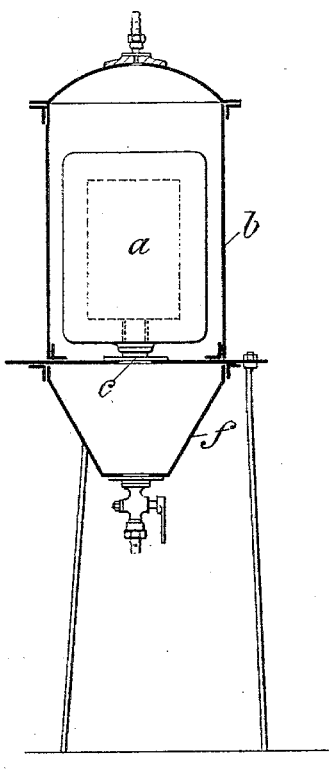

Figures 1, 2, 3, and 4 show pocket-filters. Figs. 5 and 7 are sectional elevations of filters for water-supplies under pressure. Fig. 6 is a similar view of a house-filter.

According to the invention the said filtering material is formed of more or less finely-powdered quartz the granules of which are cemented together by insoluble silicates. The cementing-silicates are obtained by the action of water-glass upon the carbonates of calcium and magnesium in the state of highest subdivision—viz., in the form of wood-ashes. Finally, the compounds not transformed into insoluble silicates are eliminated by lixiviation.

To prepare the improved filtering medium, I proceed as follows: Quartz is finely ground by means of ordinary mills or edge mills, the degree of trituration depending on the greater or lesser permeability to be obtained and the powder being sifted through a bolting-cloth. The wood-ashes destined to form silicates with the silicic acid of the water-glass may be used in a lixiviated or non-lixiviated state. In the latter case they contain carbonate of calcium, ($CaCO_3$,) fifty per cent.; carbonate of magnesium, ($MgCO_3$,) six per cent.; carbonate of potassium, ($K_2CO_3$,) eleven per cent.; carbonate of sodium, ($Na_2CO_3$,) ten per cent.; silicic acid, ($SiO_2$,) five per cent.; phosphates and sulfates, eighteen per cent. On the other hand, lixiviated wood-ashes have on an average the following composition: carbonate of calcium, ($CaCO_3$,) sixty-five per cent.; carbonate of magnesium, ($MgCO_3$,) eight per cent.; silicic acid, ($SiO_2$,) six per cent.; phosphates, twenty-one per cent.

When using lixiviated wood-ashes as well as when using non-lixiviated ones, from three to four per cent., by weight, of them are added to and thoroughly mixed with the powdered quartz.

The composition of the water-glass, which is in all cases a solution of free silicic acid in an aqueous solution of an alkaline silicate, (ordinarily silicate of sodium,) corresponds to the formula $Na_2SiO_3+2SiO_2$, or even $Na_2SiO_3+3SiO_2$. It is used in a concentrated state, and when it is intended to pour the mass into molds I add to the mixed powder of quartz and wood-ashes sufficient concentrated water-glass to obtain a doughy mass. When pressure is to be used in molding, and I prefer that it should be, it is only necessary to wet the powdered mass with the concentrated water-glass. In the molds, which are of a form that will give prismatic or cylindric hollow bodies having a narrow orifice, the mass is allowed to harden, this taking place in consequence of the carbonates contained in the wood-ashes being transformed into silicates at the cost of the existing free silicic acid as expressed by the following equations:

$$CaCO_3 + SiO_2 = CaSiO_3 + CO_2.$$
$$MgCO_3 + SiO_2 = MgSiO_3 + CO_2.$$
$$K_2CO_3 + SiO_2 = K_2SiO_3 + CO_2.$$
$$Na_2CO_3 + SiO_2 = Na_2SiO_3 + CO_2.$$

It is obvious that the four above equations apply to the case of non-lixiviated wood-ashes, while in the case of lixiviated wood-ashes merely the reactions expressed by the first and second equations take place.

The hardened hollow bodies are taken out from the molds and allowed to dry at the ordinary temperature or by being subjected to artificial heat, according to the season. During the drying the dissolved silicic acid of any excess of water-glass is separated, as amorphous silicic acid ($SiO_2$,) or the existing excess of carbonates takes solid form.

The silicates of calcium and magnesium formed in the manner described permanently cement together the mass, wherefore the same may, after the lixiviation of the residuary water-glass or carbonates, be used as a filtering medium forthwith. The said lixiviation is carried through by boiling the hollow bodies during about two hours in water. I prefer, however, in all cases, and more especially when non-lixiviated wood-ashes have been used, to bake or burn the molded, hardened, and dried hollow bodies or filtering vessels at a temperature of from 1,000° to 1,200° Celsius to lixiviate them. By the said burning or baking the existing silicates of calcium and magnesium are caused to combine with the silicates of potassium and sodium, so as to form double silicates much resembling ordinary glass. At the same time the fritted silicates are more uniformly distributed between the granules of quartz, as will be readily understood.

The burned or baked filtering bodies are freed from soluble matters, as already explained, by boiling them in water during about two hours.

Figure 1:
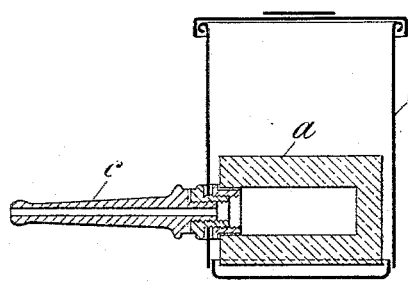
Figure 2:
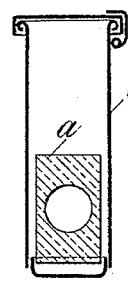

Figs. 1 and 2 of the accompanying sheet of drawings are sectional elevations of a pocket-filter, in which the hollow body $a$, having porous sides, is inserted into a sheet-metal box $b$, intended to receive the liquid to be filtered. The pipe $c$, at which the user is to suck, screws through a hole of the side of the sheet-metal box $b$ into a bush cemented into the orifice of the hollow body $a$, suitable rubber washers being interposed.

Figure 3:
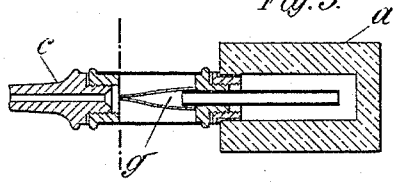
Figure 4:
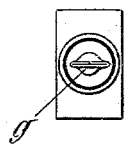

The filter shown in two sections by Figs. 3 and 4 is likewise a pocket-filter, but without a receptacle for the liquid to be filtered. At use this filter is dipped into the vessel, brook, or pool containing the water one intends to drink, whereupon suction is exerted through the pipe $c$. In order to prevent the filtered liquid from receding while suction is momentarily interrupted, a non-return valve $g$, made of rubber lips, may be interposed between the filtering body $a$ and the pipe $c$.

Fig. 5 is a sectional elevation of a filter destined for a water-supply under pressure. The receptacle $b$ is hermetically closed and connected with a tap $d$ of the conduit. The exit-pipe $c$ of the filtering body $a$ projects through the bottom of the receptacle $b$.

Fig. 6 is a sectional elevation of a house-filter for isolated farms and the like. The sheet-metal receptacle $b$, containing the filtering body $a$, is made sufficiently high to create the required pressure around the filtering body. The compartment $f$ receives the filtrate.

The filter Fig. 7 is again destined to be connected with a tap of a water-supply under pressure, wherefore its outer shell $b$ is tightly closed. $f$ is the filtrate-collecting chamber.

It is obvious that filters of the description referred to may comprise a plurality of filtering bodies and may also be combined with pumps which force or suck the liquid through the porous sides of the hollow bodies, or the arrangement may be thus, that the pump first sucks the liquid through one set of hollow bodies and afterward forces it through another set.

Having fully described my invention, what I claim, and desire to secure by Letters Patent, is—

1. An improved filtering material, consisting of granules of ground quartz, which are cemented together by the double silicates of calcium and potassium, calcium and sodium, magnesium and potassium, magnesium and sodium, substantially as described.

2. The described process of making a filtering material, the said process consisting in wetting with water-glass a mixture of ground quartz and lixiviated or non-lixiviated wood-ashes, pouring or pressing the mass into molds, where it is allowed to harden, unmolding the hardened bodies drying the unmolded hardened bodies, and finally boiling them in water.

3. The described process of making a filtering material, the said process consisting in wetting with water-glass a mixture of ground quartz and lixiviated or non-lixiviated wood-ashes, pouring or pressing the mass into molds, where it is allowed to harden, unmolding the hardened bodies drying the unmolded hardened bodies, heating them to a temperature of from 1,000° to 1,200° Celsius, and finally boiling them in water.

In witness whereof I have signed this specification in presence of two witnesses.

FRANZ JURSCHINA.

Witnesses:
VICTOR KERPL,
HARRY BELMONT.